(No Model.)
B. E. GREGORY.
EYEGLASSES.
No. 468,951.  Patented Feb. 16, 1892.
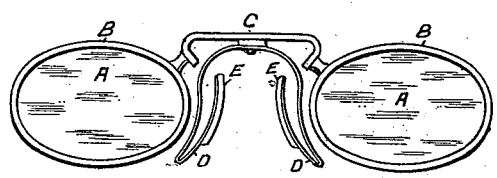
Witnesses:
D. W. Gardner
H. M. Valentine
Inventor:
Brainard Elmon Gregory

UNITED STATES PATENT OFFICE.

BRAINARD ELMORE GREGORY, OF BROOKLYN, NEW YORK.

EYEGLASSES.

SPECIFICATION forming part of Letters Patent No. 468,951, dated February 16, 1892.

Application filed December 10, 1889. Serial No. 333,201. (No model.)

*To all whom it may concern:*

Be it known that I, BRAINARD ELMORE GREGORY, a citizen of the United States, residing in the city of Brooklyn, county of Kings, and State of New York, have invented certain new and useful Improvements in Eyeglasses; and I hereby declare that the following is such a full, clear, and exact description of certain eyeglasses embracing my invention as will enable any one skilled in the art to which my invention appertains or with which it is most nearly connected to make and use the same, reference being had to the accompanying drawings, making part of this specification, and to the letters of reference marked thereon.

My invention consists of certain novel parts and combinations of parts composing an improved pair of eyeglasses.

In the claims concluding this specification I will point out the separate and independent features comprising my said invention.

In this specification I employ the term "eyeglasses" in the ordinary sense. Eyeglasses are retained in position by friction between some part of the glasses or frame of the glasses and the nose, which friction is ordinarily obtained by means of a suitable spring joining and holding the glasses together. A pair of spectacles, on the other hand, are retained in position by other means—such, for instance, as wires passing behind the ears and are joined and held together by an inflexible or non-elastic band or wire. Spectacles are superior to eyeglasses because, among other things, the glasses in spectacles are always maintained at a given distance apart and with an unvarying relation to each other. In some kinds of glasses this is a feature of very great importance and is, perhaps, essential, because it insures the proper relation between the eyes and the glasses, so that the person wearing them will always look through the same part of the glass, and that the part specially ground to correct the defects of vision. For this reason in cases of astigmatism, for instance, occulists in most cases strongly recommend the use of spectacles, as in eyeglasses such a determined relation between the eyes and the glasses cannot or will not be maintained, and this is important, since the glasses are ground to correct a defect, which consists in refracting the rays of light differently in different planes. Patients, however, frequently object to the use of spectacles because they are inconvenient to carry, require more labor to adjust, and are usually considered unsightly and unbecoming.

The object of my invention is to make a pair of eyeglasses which will possess the desirable characteristics of spectacles and which will be substantially as convenient and becoming as the eyeglasses in ordinary use at the present day.

In the accompanying drawings is illustrated a pair of eyeglasses embodying my present invention.

I will now describe the glasses illustrated in the accompanying drawings, which embody my invention in preferred forms, preparatory to pointing out in the concluding claims the several features of invention which I claim and desire to secure by these Letters Patent. It is to be distinctly understood, however, that my invention is not limited to the precise devices and combinations of devices shown, as various modifications may be made without departing from the essential features of my invention or the scope of the concluding claims.

A A are glasses surrounded by frames B B of ordinary construction.

C is a bar of suitable material, such as metal, having a rigidity sufficient to insure the glasses being always maintained in their proper position with relation to each other or permitting only a small and unimportant variation. In ordinary eyeglasses this bar is made of spring metal, the resilience of which is relied upon to give the necessary lateral friction on the nose to maintain the glasses in position. In my improved glasses, however, it is made substantially rigid. D is a spring attached to this rigid bar C at or near its center. The metal at this point is reinforced, so as to add rigidity and strength to the structure without unduly increasing the cross-section of the rigid bar. This spring has the necessary resilience to give the requisite lateral friction on the nose to maintain the glasses in position.

E E are slips of cork or some roughened non-corrosive material, as in ordinary eyeglasses. As they form no part of my present invention and are old in various forms, a further description of them is unnecessary.

Of course it will be understood that the frames B B may be omitted and the connecting wire or rod C be riveted to the glasses themselves.

It will be observed that the eyeglasses above described very closely resemble ordinary eyeglasses now in general use. The rigid bar C bears substantially the same relation to the glasses as does the ordinary spring-ribbon. It is desirable that the spring D should have considerable length, as this increases the resilience and adaptability to varying conditions. By employing a rod C, which rises above the point where it is attached to the glasses, this desirable feature is obtained, as the structure requires or permits the use of a longer spring than it otherwise would. To still further increase the length of spring, I have shown it bent upon itself, and this is the form which I prefer. By attaching the spring to the center of the rigid bar C, I obtain two advantages. In the first place, the spring is made longer than it would be if it were attached, as in ordinary glasses, to the point where the said bar is attached to the glasses or to their frames, and, in the second place, it enables me to use a lighter bar C, because attached at this point the action of the spring when drawn apart has no tendency to bend the bar and brings no strain whatever upon it. These are important considerations in the construction of practical and generally useful eyeglasses.

In the foregoing specification I have referred to a few of the obvious modifications which may be adopted in practicing my invention; but I have not endeavored to specify all the modifications which may be employed, because I understand that such an enumeration is not required here and would not be desirable, even if possible, the object of this specification being to instruct persons skilled in the art to practice my inventions in their present preferred forms and to enable them to understand their nature, and I desire it distinctly to be understood that mention by me of a few modifications is in no way intended to exclude others not referred to, but which are within the spirit and scope of my inventions.

As I have before remarked, many of the details and combinations illustrated and above described are not essential to my several inventions, broadly considered. All this will be indicated in the concluding claims, as the omission of an element or the omission of reference to the particular features of the elements mentioned are intended to be formal declaration of the fact that the omitted element or features are not essential to the invention therein covered.

Having thus described a device embodying my invention, what I claim, and desire to secure by these Letters Patent, is—

1. In a pair of eyeglasses, the combination, with a rigid bar C, of a curved spring D, joined to the center of said bar and having a nose-clamp E E, substantially as described.

2. In a pair of eyeglasses, the combination, with a rigid bar connecting said glasses, of a nose-clamp having convex bearing-surfaces which press upon and grip the sides of the nose, said clamp being joined to said bar between the points of attachment to said glasses.

3. In a pair of eyeglasses, the combination, with a rigid bar C, of a nose-piece composed of a reflexed spring attached to the center of said bar.

4. In a pair of eyeglasses, the combination, with a rigid bar connecting said glasses, of a nose-clamp joined to the center of said bar, the metal at the point of joining being reinforced.

5. In a pair of eyeglasses, the combination, with a rigid bar connecting said glasses and rising above them, of a nose-clamp joined to said bar between the points of attachment to said glasses.

BRAINARD ELMORE GREGORY.

Witnesses:
W. J. GREGORY,
Mrs. M. D. GREGORY.